United States Patent
Korf

[15] 3,687,883
[45] Aug. 29, 1972

[54] WATER EXTENDED POLYESTER RESIN

[72] Inventor: Christiaan Korf, Haarlem, Netherlands

[73] Assignee: Woods Research and Development Corporation, Oklahoma City, Okla.

[22] Filed: July 6, 1970

[21] Appl. No.: 52,738

[52] U.S. Cl..................260/29.6 NR, 260/2.5 N, 260/29.6 WQ, 260/29.6 RB, 260/40 R, 260/864
[51] Int. Cl............................................C08f 43/02
[58] Field of Search..........260/29.2 UA, 29.6 NR, 29.6 MN, 260/29.6 RB, 29.6 WQ, 861, 864

[56] References Cited

UNITED STATES PATENTS

| | | | |
|---|---|---|---|
| 2,443,735 | 6/1948 | Kropa | 260/45.4 |
| 3,244,772 | 4/1966 | Von Bonin et al | 260/861 |
| 3,256,219 | 6/1966 | Will | 260/2.5 |
| 3,442,842 | 5/1969 | Von Bonin | 260/29.2 |

*Primary Examiner*—William H. Short
*Assistant Examiner*—E. A. Nielsen
*Attorney*—Richards, Harris and Hubbard

[57] ABSTRACT

A solid water extended polyester resin is formed by esterifying a polycarboxylic acid with a polyol, adding a cross-linking agent, forming a water in oil emulsion stabilized by an emulsifying agent, and thereafter polymerizing the resin. The emulsifying agent is ammonium carbonate-carmabate.

40 Claims, No Drawings

3,687,883

WATER EXTENDED POLYESTER RESIN

BACKGROUND OF THE INVENTION

This invention relates to water extendible polyester resins useful as molding compositions, wood substitutes, hydraulic cements and the like. In another aspect, the present invention relates to improved processes for preparing water extendible polyester resins, i.e., methods for preparing highly stabilized emulsions of a polyester, cross-linking agent, and water, and particularly emulsifying agents for stabilizing such emulsions.

Water in oil emulsions are known to the prior art. For example, U.S. Pat. No. 3,256,219 discloses a water in oil emulsion containing a polymerizable organic liquid. The emulsions disclosed in the above patent comprise a continuous oil phase, a discontinuous water phase and a catalyst system to promote setting and hardening of the emulsions. Other nonpolymerizable components may be added if desired for a particular end use.

When working with such emulsions, particularly those wherein the oil phase contains an unsaturated polyester resin, it has been observed that the water phase separates, not only under pressure, but also with time under ambient conditions. Many applications for such water extendible polyester resins require the use of significant pressures, for example, during pumping of a water extended polyester resin hydraulic cement for sealing oil well casings and the like.

Prior to the present invention, the commercially available products have not been reliable. The uncured polyester resins from which water in oil emulsions are derived have had their formulations changed many times, indicating that the producers have been striving for a more satisfactory product. All of the emulsions prepared from these commercially available products exhibit breakdown under pressure and fluid loss and separation when one attempts to store the emulsions for any length of time. The prior emulsions also require high shear mixing to form the discontinuous water phase in the uncured resin.

In addition, it has been found that desirable properties can be attributed to products which have a high water content after setting, manifested by the presence of water droplets in the water in oil emulsion. Likewise when a high content of cross-linking agent, for example styrene, is present, additional desirable properties are obtained. Products prepared from water extended resins having a high content of monomer or cross-linking agent exhibit desirable properties which make them attractive substitutes for wood. As a substitute for wood the settable polyester resins can be utilized in the manufacture of furniture, wall panels, statuettes and the like. In addition, these high monomer content water extended polyester resins have a large amount of void space present when the water component is removed after the resin has set. The high void space and ready moldability of such water extended resins also make them an attractive material for use as an insulating material, for example, for use around water or sewage lines and the like. Such compositions can be molded in situ, or can be manufactured prior to use.

Prior to the present invention, however, such water extendible polyester resins have been unsatisfactory. The price has been high making them non-competitive. Water in oil emulsions having a high water and monomer content exhibit even greater dimensional instability and pressure breakdown than do those emulsions containing a lesser amount of water and cross-linking agent or monomer. In addition, high shear mixing has been needed to form the water in oil emulsions. Further, these emulsions have had to be polymerized very quickly after being formed to prevent breakdown thereof. Prior to the present invention, these undesirable attributes have made the acceptance of such polyester resins very slow.

It is, therefore, desirable to formulate a process for preparing water extended polyester resins and an intermediate water in oil emulsion which would not have the inherent unattractive characteristics of the prior art resins. It is desirable to increase the amount of water in the water extended resin to lower the total price of the resin, thus making it more economically attractive. It is furthermore desirable to possess a water in oil emulsion which will exhibit dimensional stability over extended periods of time. It is further desirable to develop such an emulsion which will not break down and will not loose water or moisture upon being subjected to pressure. It is further desirable to develop an emulsifying technique which will allow the use of conventional low shear mixing equipment rather than high shear mixers as required by the prior water in oil emulsions.

SUMMARY OF THE INVENTION

The present invention, therefore, provides a highly stable water in oil emulsion containing a settable polyester component, a process for making a water extended polyester resin and a method of forming an emulsion containing a polyester, water and a cross-linking agent.

The water in oil emulsion comprises an unsaturated resin, an ethylenically unsaturated monomer cross-linking agent, water, and an emulsifying agent of ammonium carbonate-carbamate. The method of forming the emulsion from a polyester, water and a cross-linking agent comprises combining the polyester, water and cross-linking agent, and admixing therewith an emulsifying agent, ammonium carbonate-carbamate.

The process for making a cross-linked or polymerized extended polyester resin comprises reacting a polycarboxylic acid with a polyol to form a polyester resin, with the proviso that at least one of the two polyester reactants is capable of cross-linking in the presence of a suitable cross-linking agent, combining the polyester resin with a cross-linking agent and water to form a mixture, thereafter subjecting the mixture to at least low shear agitation in the presence of an amount of an emulsifying agent, ammonium carbonate-carbamate, effective to form a stable water in oil emulsion from the water, polyester and cross-linking agent, and thereafter polymerizing the resin to form a solid water extended polyester.

The present invention will be better understood by reference to the ensuing specification. Upon reading it many variations, alternatives and further advantages of the process and emulsions disclosed herein will become apparent to one of ordinary skill in this art.

DEFINITION OF TERMS

To facilitate understanding of the present disclosure by those employing it, definitions of the terms used herein have been set forth. These definitions are intended as a general guideline; variations upon them will be apparent to those of ordinary skill in this art. The testing procedures utilized in the examples are also described. In addition, all percentages used herein are weight percentages unless otherwise indicated.

The term "polyester" includes the reaction product of a polyhydric alcohol and a polycarboxylic acid under esterification conditions. The term as used herein does not include the cross-linking agent or monomer which can copolymerize with the polyester to form a solid composition. "Polyester resin" is employed to denote the polyester-cross-linking agent composition, both before and after the composition has been cross-linked and polymerized. The term "polycarboxylic acid" includes those carboxylic acids which have two and three functional carboxy groups attached to a base group. Polycarboxylic acids include saturated and unsaturated aliphatic and aromatic polycarboxylic acids. The term "polyol" includes those alcohols, both aromatic and aliphatic, which contain two or more functional hydroxy groups. The term "polyol" is used synonymously with polyhydric alcohol. The term "saturated" is used herein to indicate the presence of vinyl or ethylenically unsaturated polymerizable radicals in the aliphatic and aromatic polycarboxylic acids and polyols. When the term "saturated" is utilized herein to further limit a term such as an aromatic dicarboxylic acid, it is to be understood that the basic benzyl radical retains its identity, and that the substituents on the benzene ring are either saturated or unsaturated as the case may be.

An "acid number" or "acid value" is the number of milligrams of potassium hydroxide which are neutralized by the free acid groups present in one gram of, for example, the polyester resin. This determination is usually done by titrating a sample in hot 95 percent ethyl alcohol and using phenolphthalein as an indicator. The acid number is an indication of the number of unreacted carboxylic acid cites remaining after, for example, an esterification reaction. "Equivalence ratio" is used herein to provide a measure of the relative number of active substituent groups in one component of a given composition to the number of active substituent groups in another component. When utilized with respect to two acids, the ratio indicates the relative number of carboxy groups originally present in each of the two different acids prior to any reaction thereof. When utilized with respect to an acid and a polyol, the ratio is indicative of the relative number of carboxy groups to hydroxy groups prior to any reaction. When utilized to define the components of a polyester resin, the measurement is, of course, made at a point in time prior to the esterification reaction, i.e., relative to the reactants rather than the free or unreacted substituents in the product.

The ratio of the acid value to the number of milligrams of the emulsifying agent of the present invention which is used is designated as the "neutralization equivalence ratio". The neutralization equivalence range, of course, is the range of these ratios which are usable within the scope of the present invention.

The cross-linking agents which are employed with the present invention are generally ethylenically unsaturated compounds which can polymerize and cross-link with the polyester resin. Generally, these cross-linking agents are added in the form of a monomer, which monomer forms part of the resin. A water in oil emulsion is one in which the oil phase, including the polymerizable materials and at least part of the additives, is continuous and the water phase is discontinuous. A water in oil emulsion is sometimes referred to in the art as a reverse emulsion.

The term "gel" and "gel time" as utilized herein refers to measurements of an arbitrary test formulated by the Standards Committee of the Reinforced Plastics Division of the Society of the Plastics Industry (hereafter SPI) to give a common basis for comparing the reactivity of resin systems. Data from the SPI test cannot be used to give a direct indication of the curing times required for a particular resin system, since the latter will be governed by the resin itself, the catalyst used, temperature of cure, heating source and mass of resin involved, among others. In the SPI test a standard quantity of resin, generally catalyzed with benzoyl peroxide, is placed in a test tube and lowered into a 180° F. constant temperature water bath. A thermocouple centered in the resin measures the temperature as curing proceeds. The gel time is taken as the time interval between the resin temperatures of 150° to 190° F. Gel time is a descriptive phrase for this time interval and does not necessarily mean that the resin actually gelled at these temperatures. Depending on the characteristics of the particular resins and the other factors described above, it may gel before or after the resin reaches 190° F. The term "cure" is utilized to indicate the formation of a solid end product.

"Separation" described the phenomenon occurring when the resin emulsion, either by improper ingredients, improper ratios, or by its own inherent characteristics, separates into water and resin instead of remaining an emulsion. "Liquid loss" is used to describe fluid separation occurring when an emulsion is placed in a container with a very fine filter at the bottom. A pressure is thereafter exerted on the emulsion by an inert gas such as nitrogen. A measurement is taken either of the amount of resin and/or the amount of water which comes through the filter paper under these pressures. The liquid loss test is valuable on a comparative basis from varying formulations.

Another pressure test which can be utilized to compare varying formulations is conducted by the following procedure. This test consists of determining the rate at which fluid is forced from a filter press containing an emulsion sample under specified conditions of pressure and time. For the tests herein a total pressure of 100 p.s.i. is exerted on the emulsion for a period of 30 minutes. The filter press utilized in the testing procedure is a screw press frame and a filter cell assembly. The cell has an internal diameter of 3 ± 0.07 inches and a height of 5 ± 0.25 inches. The top of the cell is filled with a gasket and a machined cap which has a small hole for admitting a pressure medium. The bottom of the cell is closed by a sheet of Wholman No. 50 filter paper backed by a wire screen and a bottom cap which is gasketed to provide an effective seal. The filtration is carried on at a 100 ± 5 p.s.i. total pressure.

A graduated cylinder is positioned to receive the filtrate. The volume accumulation of filtrate for 30 minutes is recorded as the filter loss or liquid loss and can be expressed in cubic centimeters.

DESCRIPTION OF PREFERRED EMBODIMENTS

According to the present invention, polyesters which can be utilized include those which are liquids under ambient conditions, are capable of forming a water in oil emulsion, and are capable of cross-linking in the presence of an appropriate and suitable cross-linking agent to form a solid cross-linked polyester product. The polyesters generally usable within the scope of the present invention are those which include the reaction product of polycarboxylic acids and polyols, reacted under normal esterification conditions. A preferable polyester is one containing ethylenically unsaturated groupings which can promote and be capable of cross-linking with an ethylenically unsaturated monomer. A preferable unsaturated polyester resin is the reaction product of a polyol and an unsaturated aliphatic dicarboxylic acid and another carboxylic acid selected from a saturated aromatic dicarboxylic acid, a mixture of saturated aromatic dicarboxylic acids with saturated monocarboxylic aromatic acids, a mixture of saturated aromatic dicarboxylic acids with saturated monocarboxylic aliphatic acids and mixtures thereof. The acids of the present invention can contain up to 16 carbon atoms; preferably they have from two to eight carbon atoms.

An aromatic dicarboxylic acid reactant will give the end product its most desirable characteristics for the uses disclosed herein. A monocarboxylic acid, preferably aromatic such as benzoic acid, can be included to function as a chain modifier. The presence of the monocarboxylic acid prevents the molecular chain from becoming too long by terminating the polymerization or esterification reaction. The practical effect of the presence of benzoic acid or other monocarboxylic acids is that it keeps the viscosity of the final polyester sufficiently low to permit easy mixing with a cross-linking agent. Of course, as a result, the viscosity of the uncross-linked polyester resin is desirably lower.

The aromatic dicarboxylic acids which can be utilized in preparing the polyesters of this invention are preferably the phthalic acids or their anhydrides. It is to be understood that when the term "acid" is utilized herein it includes the anhydride thereof. Phthalic anhydride is the most preferred saturated aromatic dicarboxylic acid. Halogenated acids such as fluorinated phthalic acids, chlorinated or brominated phthalic acids or their derivatives can also be used. In addition to the saturated aromatic dicarboxylic acids, it is preferred that an unsaturated aliphatic dicarboxylic acid be employed in conjunction therewith. Alpha, beta, unsaturated aliphatic dicarboxylic acids such as maleic anhydride, fumaric acid and itaconic acid are most preferred. The most preferred unsaturated aliphatic dicarboxylic acid is maleic anhydride. Both saturated aromatic and aliphatic monocarboxylic acids can be utilized as chain terminators to maintain the viscosity of the polyester resin at a low level. Such acids include the preferred monocarboxylic acids such as benzoic acid, o-toluic, m-toluic and p-toluic acids, and caproic acid. The aliphatic acids of this invention, both monocarboxylic and polycarboxylic, can include straight chain and cycloaliphatic structures. In addition to the dicarboxylic acids usable with the present invention, small amounts of tricarboxylic acids such as trimellitic acid or adducts of rosin with maleic acid anhydride, for example, maleopimaric acid, can be utilized.

The polyols of this invention include cyclic and acyclic polyols. Ordinarily, the polyols can contain from two to 16 carbon atoms; however, those containing from two to eight carbon atoms are preferably employed. Most preferred are the saturated aliphatic diols. These, of course, include the alkylene glycols. Examples of preferred alkylene glycols include ethylene and propylene glycol, with the latter being the most preferred. The glycols also can contain an additional acid group such as occurs in dimethylolpropionic acid. Examples of other glycols which can be used with the present invention are diethylene glycol, 1,6-hexane diol, neopentyl glycol, 2,2,4-trimethyl-3-pentane diol, and hydrogenated bisphenol-A as well as mixtures thereof. Other polyols including those containing three or more hydroxy groups can also be utilized with the present invention. Examples of polyols containing more than two hydroxy groups include glycerine, pentaerythritol, dipentaerythritol, trimethylolmethane, trimethylolpropane, sorbitol, mannitol and mixtures thereof. Preferred triols are glycerol and trimethylolpropane. The best resins are obtained when the polyol is selected from diols and mixtures of diols with up to 20 mol percent of alcohols selected from triols and monocarboxylic acid alcohols.

It is preferred that the equivalence ratio of total acids, including the monocarboxylic and polycarboxylic acids, to total polyols varies between 2.0:2.0 to 2.6:2.0. A most preferred ratio is 2.1:2.0. The equivalence ratio of saturated aromatic dicarboxylic acids to unsaturated aliphatic dicarboxylic acids preferably varies between 0.7:1.3 to 1.2:1.8. A most preferred ratio is 1.0:1.0. The preferred equivalence ratio of saturated aromatic dicarboxylic acids to monocarboxylic acids is from 1.0:0 to 0:0.7. The most preferred ratio of saturated aromatic dicarboxylic acids to monocarboxylic aromatic acids is 0.95:0.05.

The polyesters of the present invention are produced under normal esterification conditions available in the prior art. For optimum results, the acid value of the polyester should fall within the range of 30 to 60, preferably from 30 to 40. The esterification of the polycarboxylic acids and polyols normally is implemented by the presence of an esterification catalyst. Suitable catalysts, although not excluding others, are salts, oxides, hydroxides or soaps of metals and alkaline earth metals. These catalysts include alkali metal soaps such as lithium naphthenate, sodium hydroxide, calcium naphthenate, lead oxide and zinc acetate. The latter compound can serve not only as an esterification catalyst, but can also prevent undesirable side reactions from occurring during the esterification process. The usual amount of esterification catalyst present in the polyester reactant mixture normally ranges from 0.01 to 0.3 weight percent based on the total reactants.

In addition, polymerization inhibitors are added to the polyester to prevent premature polymerization and cross-linking in the emulsion after the polyester is combined with a cross-linking agent. Suitable inhibitors are hydroquinone, substituted hydroquinones, such as monomethylether of hydroquinone, parabenzoquinones, naphthaquinones, or cresols such as 2,6-ditertiary butyl cresol. Other inhibitors such as copper salts, for example, copper naphthenate, and quanternary ammonium compounds can also be utilized. The quantity of inhibitor depends upon the type of polymerization and cross-linking catalysts used and other emulsion ingredients, but is usually present in an amount from 0.001 to 0.2 percent (weight percent) based on the total reactants.

Various cross-linking agents can be employed to set, polymerize or cross-link the polyester to form a solid resin. Those most preferred are the ethylenically unsaturated or vinyl monomers which can react with ethylenically unsaturated groups in the polyester. In addition, these ethylenically unsaturated monomers can polymerize with themselves, thus contributing to a more desirable end product. A most preferred cross-linking agent is styrene. Others usable within the scope of the present invention include vinyl toluene, chloro styrenes, bromo styrenes, methylmethacrylate, other methacrylate esters, and acrylonitrile. Other vinyl monomers include vinyl acetate, divinyl benzene, fumarate esters, vinyl butyrate, vinyl ethers, vinyl chloride, vinylidene chloride, diallyphthalate, and triallylcyanurate. It is, of course, understood that mixtures of these monomers may also be utilized to provide an effective cross-linking agent.

As previously mentioned, inhibitors have been added to the polyester to prevent premature cross-linking and polymerization of the monomer after it is combined with the polyester. Although it is best to add the inhibitors to the polyester, they can be added to the cross-linking agent, or to both, if desired. The amount of cross-linking agent which can be added to the polyester resin can vary from 30 to 70 weight percent of the polyester resin cross-linking agent mixture. Styrene is, of course, the most preferred ethylenically unsaturated cross-linking agent. A preferred amount of styrene to be utilized with the present invention ranges from 50 to 60 weight percent based on the polyesterstyrene mixture.

The polyester, cross-linking agent and other additives such as inhibitors can be combined simultaneously with or apart from water. The components are usually placed in a mixing device which can be either of the high or low shear type. One of the advantages of the invention is that the latter can be effectively employed. Water is utilized in accordance with the present invention preferably from 50 to 80 percent (weight percent) of the total polyester-monomer-water mixture, most preferably from 55 to 65 percent (weight percent) of the mixture. Added to the water-resin mixture is the emulsifying agent which has been discovered for promoting the formation of and stabilizing high water content, high monomer content, water extended polyester resin emulsions. The emulsifying agent is ammonium carbonate-carbamate, sometimes referred to as ammonium carbonate. This composition is commercially available and is a mixture of ammonium acid carbonate and ammonium carbamate [$(NH_4)HCO_3 \cdot (NH_4)CO_{22}$]. Best results are obtained when the emulsifying agent of the present invention is added in the preferred amount within a neutralization equivalence range of between 0.8 and 1.2.

It is believed that this emulsifying agent stabilizes the emulsion formed upon mixing the polyester, monomer, water and emulsifying agent by the formation of amine soaps with the acid groups of the unsaturated polyester resin. These soaps act as a protective colloid for the emulsion and at the same time stabilize the monomer constituent. No theory about the selectivity of the emulsifying agent can be proferred. There seems to be at present no reasonable explanation why the amine compound will stabilize the emulsion described above while other compounds which are very closely related in structure will not stabilize the emulsion of the present invention.

Other additives such as fillers, detergents and low molecular weight polyethers can also be incorporated in the emulsion. Fillers such as calcium carbonate can be utilized. Other fillers include talc and titanium dioxide. The use of nonionic surfactants of HLB range 1–3 may be of value in the present invention. As an example a polyalkylene ether can be utilized such as Igepal CO-730, commercially available from General Aniline and Film Corporation located at 140 West 51st, New York, N.Y. Igepal CO-730 is a nonylphenoxypoly (ethyleneoxy) ethanol. Igepal surfactants do not ionize in water, hence are nonionic or nonelectrolitic. They are not subject to hydrolysis by aqueous solutions of acid or alkali. Since they cannot form salts with metal ions, they are equally effective in hard and soft waters. Their nonionic nature makes them useful with either anionic or cationic agents, and with positively or negatively charged colloids. Such a surfactant is used for general detergency and dispersency in the emulsion.

After the emulsion containing the polyester, cross-linking agent or monomer, water and emulsifying agent is thoroughly mixed to form a water in oil emulsion, it can be reacted to form the desired product at any location. It can be molded, for example, by pouring an amount of the emulsion into a suitable mold of predetermined shape and thereafter polymerized. In addition, the emulsions of the present invention can be stored for great lengths of time. The emulsions of the present invention can also be mixed at the site of use. For example, when utilized as a cement for filling holes in drill casings, the emulsion can be mixed and stabilized at the well site.

The polymerization of the polyester resin is carried out by the addition of vinyl polymerization initiators and accelerators. Subsequent to addition of the initiator and accelerator, depending upon the amounts of each added, the polyester resin monomer will begin to gel and solidify within a predictable amount of time. Thus, when used as a casing cement, the polymerization can be controlled to occur within a few minutes to eight or more hours, depending upon the inhibitors, initiators and accelerators present. Examples of initiators which are commonly used with polyester resins are hydroperoxides, diacylperoxides, ketoperoxides or organic peracids. It is important when choosing a peroxide, either alone or in combination with the initiator and/or accelerator, that its decomposition temperature is not too high. Preferably a peroxide is chosen which permits curing at room temperature. The peroxides may be soluble or insoluble in water, both types giving good results. Hydrogen peroxide, although usable, is not preferred since it usually decomposes too fast in the emulsion environment. Diacylperoxides which are preferred are benzoyl peroxide and halogenated benzolyperoxides. Ketoperoxides usable within the scope of this invention include methylethylketone peroxide or cyclohexanone peroxide. In addition, hydroperoxides such as tertiarybutyl hydroperoxide or cumene hydroperoxide are usable. Of the foregoing polymerization initiators, benzoyl peroxide and methylethylketone peroxide are most preferred.

Accelerators can be used to accelerate or shorten the decomposition time of the peroxides, thus permitting a shorter curing time and/or a lower curing temperature. Normally, the minimum obtainable curing temperature for unsaturated polyesters is about 15° C. Accelerators which can be used within the present invention are salts and soaps of metals which exhibit more than one valency. Predominantly utilized in this area are cobalt and vanadium salts and soaps. Certain amines which function through a redox reaction in which amino oxides are formed can also be employed. It is to be recognized that each class of peroxide needs its own specific accelerator system. For diacylperoxides (benzoyl peroxide) acceleration can be obtained by utilizing certain amines such as dimethylaniline and dimethyl-p-toluidine. Cobalt salts, for example, do not accelerate the diacylperoxides. The metal salts such as cobalt naphthenate are very active accelerators for the hydroperoxides, ketoperoxides and peracids. Many cobalt activated systems can also be superactivated by the addition of the aforementioned amines. For example, a super activation system includes methylethylketone peroxide, cobalt naphthenate and dimethylaniline. Other accelerators such as ferrocenes, mercaptans, aromatic sulfinic acids, phosphines and acetylaceton can also be used.

Of course, the choice of initiator and accelerator will depend somewhat upon the polyester resin-monomer system chosen. More important, however, is the gel time which is highly dependent upon the particular choice of initiator and accelerator for the cross-linking or resin polymerization reaction. The preferred ranges of initiators and accelerators are as follows, weight/percent based on the total polyester and monomer in the emulsion: for peroxides, 0.5 to 5.0 percent; metal salt accelerators, 0.001 to 0.10 percent, based on the equivalent amount of metal relative to the emulsion; for the amine accelerators, 0.001 to 1.0 percent.

EXAMPLES

The following examples are included to illustrate the method by which the emulsion of the present invention can be prepared. The examples include preferred embodiments of the present invention as well as comparative examples which illustrate the advantages of the present invention. These examples are not intended to be delimitative of the scope of the present invention; they are intended as a guide to those skilled in the art who desire to reproduce and utilize the disclosed emulsion. All percentages used herein are weight/percentages unless otherwise specified.

EXAMPLE I

To a polyester originally containing 40 percent propylene glycol, 36 percent phthalic anhydride, 24 percent maleic anhydride, additionally containing 0.025 percent lead oxide, 0.05 percent zinc acetate and 0.05 percent hydroquinone based on total reactants, is added styrene monomer in a ratio of 70 percent polyester to 30 percent styrene monomer (normal inhibition). Also 1.25 percent of a Co-naphthenate solution containing 6% cobalt, 0.5 percent dimethylaniline and 2 percent ammonium carbonate-carbamate are added, based on the amount of polyester. To this polyester resin, water is added in the ratio of 40 percent resin (or polyester-styrene monomer mixture), 60 percent water together with 0.5 percent of a peroxide catalyst, methylethylketone peroxide (based on the amount of polyester) which is dispersed in the water. After mixing by adding the water-catalyst mixture to the resin and agitating with conventional low shear mixing equipment, the product gels in 10 minutes at 20° C. and hardens in 30 minutes at 20° C. The emulsion remains stable and intact at a pressure of 100 p.s.i. utilizing one of the tests described above.

A sample of the emulsion is poured into a mold the shape of a frustum of a cone. The resin gels within 10 minutes after the emulsion is formed at 20° C. A solid cross-linked polyester styrene structure is obtained when the resin cures. The structure is characterized by small water droplets uniformly distributed throughout the structure. The structure can be sawed by an ordinary wood saw and is substantially water impermeable.

EXAMPLE II

Styrene monomer is added to the same polyester as used in EXAMPLE I in a ratio of 70 percent polyester to 30 percent styrene monomer (normal inhibition). Also added are 0.5% cobalt naphthenate as 6 percent solution, 0.2 percent dimethylaniline and 2 percent ammonium carbonate-carbamate, based on the polyester. Water is added to this resin in the ratio of 40 percent polyester-monomer to 60 percent water, along with 0.5 percent of a peroxide catalyst, methylethylketone peroxide, (based on the amount of polyester) which is dispersed in the water. After emulsifying by adding the water-catalyst mixture to the resin and agitating at low shear, the product gels in 80 minutes and cures in 10 hours, both measured at 20° C. The emulsion remains stable and intact at a pressure of 100 p.s.i.

EXAMPLE III

To the same polyester used in EXAMPLE I, styrene monomer is added in a ratio of 70 percent polyester to 30 percent styrene monomer (normal inhibition). Also added are 0.5 percent cobalt naphthenate as 6 percent solution, 0.06 percent dimethylaniline and 0.1 percent paratertiarybutylcatechol (5 percent solution in styrene), and 2 percent ammonium carbonate-carbamate, based on the polyester. To this resin mixture, water is added in the ratio of 40 percent resin to 60 percent water. Prior to mixing 0.5 percent of the peroxide catalyst (based on the amount of polyester) is dispersed in the water. After emulsifying at low shear, adding the water-catalyst mixture to the resin mixture, the product gels in 5 hours at 20° C. and cures in 24 hours. The emulsion remains stable and intact at a pressure of 100 p.s.i.

EXAMPLE IV

A polyester is prepared which is the reaction product of 40 percent propylene glycol, 36 percent phthalic anhydride, 24 percent maleic anhydride, reacted in the presence of 3 percent benzoic acid, 0.025 percent lead oxide, 0.050 percent zinc acetate, 0.050 percent hydroquinone (based on the total polyol and polycarboxylic acid). Styrene monomer is added to this polyester in a ratio of 60 percent polyester to 40 percent styrene monomer (normal inhibition). Also added are 1.25 percent cobalt naphthenate as 6 percent solution, 0.5 percent dimethylaniline and 1.7 percent ammonium carbonate-carbamate. Water is added to this resin mixture in the ratio of 40 percent resin to 60 percent water, along with 0.5 percent of a peroxide catalyst (based on the amount of polyester) which is dispersed in the water. After emulsifying by adding the water-catalyst mixture to the resin and agitating at low shear, the product gels in 10 minutes at 20° C and cures in 30 minutes. The emulsion remains stable and intact at a pressure of 100 p.s.i.

EXAMPLE V

To the same polyester used in EXAMPLE IV styrene monomer is added in a ratio of 60 percent polyester to 40 percent styrene monomer (normal inhibition). Also added are 0.5 percent cobalt naphthenate as 6% solution, 0.12 percent dimethylaniline and 1.7 percent ammonium carbonate-carbamate (based on the polyester). Water is added to this resin in the ratio of 40 percent resin to 60 percent water. 0.5% of the peroxide catalyst (based on the polyester) is dispersed in the water prior to mixing. After emulsifying by adding the water-catalyst mixture to the resin, the product gels in 60 minutes at 20° C and cures in 2 hours. The emulsion remains stable and intact at a pressure of 100 p.s.i.

EXAMPLE VI

To the same polyester used in EXAMPLE IV, styrene monomer is added in a ratio of 60 percent polyester to 40 percent styrene monomer (normal inhibition). Also added are 0.5 percent cobalt naphthenate as 6% solution, 0.12 percent dimethylaniline and 0.2 percent p-tertiarybutyl catechol (as 5 percent solution in styrene), and 1.7 percent ammonium carbonate-carbamate (all based on the polyester). To this resin mixture, water is added in a ratio of 40 percent resin to 60 percent water, together with 0.5 percent of the peroxide catalyst (based on the amount of resin) dispersed in the water. After emulsifying at low shear by adding the water-catalyst mixture to the resin, the product gels in 2 hours at 20° C. and cures in 4 hours. The emulsion remains stable and intact at a pressure of 100 p.s.i.

EXAMPLE VII

To the same polyester used in EXAMPLE IV, styrene monomer is added in a ratio of 60 percent polyester to 40 percent styrene monomer (normal inhibition). Also added are 0.5 percent cobalt naphthenate as 6 percent solution and 1.7 percent ammonium carbonate-carbamate (based on the polyester). To this resin mixture water is added in a ratio of 40 percent resin to 60 percent water, along with 0.5 percent of a peroxide catalyst (based on the polyester) which is dispersed in the water. After emulsifying at low shear by adding the water-catalyst mixture to the resin, the product gels in 4 hours at 20° C. and cures in 8 hours. The emulsion remains stable and intact at a pressure of 100 p.s.i.

EXAMPLE VIII

To the same polyester used in EXAMPLE IV, styrene monomer is added in a ratio of 35 percent polyester to 65 percent styrene monomer (normal inhibition). Also added are 1.25 percent cobalt naphthenate as 6 percent solution, 0.5 percent dimethylaniline and 1.7 percent ammonium carbonate-carbamate (based on the polyester). To this resin mixture, water is added in the ratio of 40 percent resin to 60 percent water, along with 0.5 percent of a peroxide catalyst (based on the amount of resin) which is dispersed in the water. After emulsifying at low shear by adding the water-catalyst mixture to the resin, the product gels in 20 minutes at 20° C. and cures in 50 minutes. The emulsion remains stable and intact at a pressure of 100 p.s.i.

EXAMPLE IX

To a commercial polyester-styrene-monomer resin (Co-Rezyn 158, commercially available from Commercial Resins Division, Interplastic Corp., St. Paul, Minn.) is added an additional 17 percent styrene. This mixture is then combined with 50 percent water, 3 percent Igepal CO-730, 2 percent ammonium carbonate-carbamate, and 1.25 percent cobalt naphthenate as 6 percent solution, 0.5 percent dimethylaniline and 0.5 percent of a peroxide catalyst as a 25 percent solution (all based on original resin). The resin is emulsified at low shear. The water extended resin gels in 105 minutes at 20° C.

EXAMPLE X

To a commercial polyester-styrene-monomer resin (Co-Rezyn 277, commercially available from Commercial Resins Div., Interplastic Corp.), is added an additional 17 percent styrene (based on original resin). This mixture is then combined with 50 percent water, 3 percent Igepal CO–730, 2 percent ammonium carbonate-carbamate, 1.25% cobalt naphthenate as 6 percent solution, 0.5 percent dimethylaniline and 0.5 percent of a peroxide catalyst (all based on original resin), and emulsified at low shear. The water extended resin gels in 55 minutes at 20° C.

EXAMPLE XI

To a commercial polyester-styrene monomer resin (Stepan 5928, commercially available from Stepan Chemical Co., Northfield, Ill.) containing 35 percent styrene is added water in the ratio of 40 percent resin to 60 percent water. Also added are 2 percent ammonium carbonate-carbamate, 1.25 percent cobalt naphthenate as 6 percent solution, 0.5 percent dimethylaniline and 0.5 percent of a peroxide catalyst as a 25 percent solution. After emulsifying at low shear, the water extended resin gelled in 30 minutes at 20° C.

EXAMPLE XII

The procedure of EXAMPLE XI is repeated raising the styrene content of the resin to 47 percent (based on the original resin). The water extended resin gels in 60 minutes at 20° C.

EXAMPLE XIII

The procedure of EXAMPLE XII is repeated substituting 1.7 percent calcium carbonate for the ammonium carbonate-carbamate. The emulsion broke during the mixing procedure, thus rendering the resin-water mixture unusable.

EXAMPLE XIV

The procedure of EXAMPLE XII is repeated substituting 1.7 percent sodium bicarbonate for the ammonium carbonate-carbamate. The mixture could not be emulsified.

EXAMPLE XV

To a commercial polyester-styrene-monomer resin (Stepan 5928), originally containing 35 percent styrene, additional styrene is admixed to bring the styrene content to 52 percent (based on total resin). Also added are 1.25 percent cobalt octoate as 6 percent solution, 0.5 percent dimethylaniline, and 2 percent ammonium carbonate-carbamate (all based on total resin mixture). This resin is mixed with 60 percent water and 0.5 percent peroxide catalyst (based on total resin), and is emulsified at low shear. The emulsion remains unchanged while subjecting it to a pressure of 100 p.s.i. The resin gels in 60 minutes at 20° C.

EXAMPLE XVI

The procedure of EXAMPLE XV is repeated except that 0.5 percent of calcium carbonate is added as a filler to the emulsion. The emulsion remains stable when subjected to a pressure of 100 p.s.i. The emulsion gels in 60 minutes at 20° C.

The water extended polyester resins produced by the foregoing procedures have the utility heretofore outlined. The present invention provides these resins with versatility and makes them economically attractive. Without departing from the spirit of the invention, variations upon the procedures and of the compositions disclosed herein will be apparent to those of ordinary skill in the art. The intent is that the invention be limited only by definition of the appended claims.

What is claimed is:

1. A stable dispersion of water in a polyester resin system comprising:
    a continuous phase comprising an unsaturated polyester which is a reaction product of a polycarboxylic acid and a polyol,
    a discontinuous phase comprising water, and
    an emulsifying agent consisting essentially of ammonium carbonate-carbamate.

2. The dispersion of claim 1 further comprising a vinyl monomer.

3. The dispersion of claim 2 wherein the monomer is styrene.

4. A water in oil emulsion of a polyester resin comprising:
    a. an unsaturated polyester which is the reaction product of a polycarboxylic acid and a polyol,
    b. a vinyl monomer cross-linking agent,
    c. water, and
    d. ammonium carbonate-carbamate.

5. The emulsion of claim 4 wherein the polyester has an acid number of from 30 to 60.

6. The emulsion of claim 5 wherein the ammonium carbonate-carbamate is present in a neutralization equivalence range of from 1.2 to 0.8.

7. The emulsion of claim 6 wherein the water comprises 50 to 80 weight percent based on the polyester-monomer-water mixture.

8. The emulsion of claim 4 wherein the monomer is styrene.

9. The emulsion of claim 8 wherein the styrene comprises from 30 to 70 weight percent based on the polyesterstyrene mixture.

10. The emulsion of claim 7 wherein the polyester is the esterification product of
    an unsaturated aliphatic dicarboxylic acid and a carboxylic acid selected from
    i. a saturated aromatic dicarboxylic acid,
    ii. a mixture of saturated aromatic dicarboxylic acids with saturated aromatic monocarboxylic acids,
    iii. a mixture of saturated aromatic dicarboxylic acids with saturated aliphatic monocarboxylic acids, and
    iv. mixtures thereof, and a polyol selected from diols and mixtures of diols with up to 20 percent by weight of alcohols selected from triols and monocarboxylic acid alcohols.

11. The emulsion of claim 10 wherein the equivalence ratio of total polycarboxylic acid to total polyol is in the range of from 2.0 to 2.6:2.0, respectively.

12. The emulsion of claim 11 wherein the equivalence ratio of total polyacid to total polyol is about 2.1:2.0.

13. The emulsion of claim 11 wherein the equivalence ratio of saturated aromatic dicarboxylic acid to unsaturated aliphatic dicarboxylic acid is in the range of from 0.7:1.3 to 1.2:1.8, respectively.

14. The emulsion of claim 13 wherein the equivalence ratio of saturated aromatic dicarboxylic acid to unsaturated aliphatic dicarboxylic acid is about 1.0 to 1.0, respectively.

15. The emulsion of claim 10 wherein the carboxylic acid is a mixture of saturated aromatic dicarboxylic acid and saturated aromatic monocarboxylic acid.

16. The emulsion of claim 15 wherein the equivalence ratio of saturated aromatic dicarboxylic acid to saturated aromatic monocarboxylic acid is about 0.95:0.05.

17. A water in oil emulsion of a polyester resin comprising:
    a. unsaturated polyester having an acid number from 30 to 60 which is the esterification product of an unsaturated aliphatic dicarboxylic acid and a carboxylic acid selected from:
    i. a saturated aromatic dicarboxylic acid, ii. a mixture of saturated aromatic dicarboxylic acids with saturated aromatic monocarboxylic acids, iii. a mixture of saturated aromatic dicarboxylic acids with saturated aliphatic monocarboxylic acids, iv. mixtures thereof, and a polyol selected from diols and mixtures of diols with up to 20 percent by weight of alcohols selected from triols and monocarboxylic acid alcohols, and wherein the equivalence ratio of saturated aromatic dicarboxylic acid to unsaturated aliphatic dicarboxylic acid is in the range of from 0.7:1.3 to 1.2:1.8, and wherein the equivalence ratio of total polycarboxylic acid to total polyol is in the range of from 2.0 to 2.6:2.0, respectively;

b. styrene in the amount of from 30 to 70 weight percent based upon the polyester resin-styrene mixture;

c. water in the amount of from 50 to 80 weight percent based upon the polyester-monomer-water mixture; and d. ammonium carbonate-carbamate present in a neutralization equivalence range of from 1.2 to 0.8.

18. The emulsion of claim 17 wherein the unsaturated aliphatic dicarboxylic acid is selected from maleic acid, fumaric acid and itaconic acid.

19. The emulsion of claim 18 wherein the saturated aromatic dicarboxylic acid is selected from isophthalic, terephthalic and phthalic acid.

20. The emulsion of claim 19 wherein the saturated monocarboxylic acids are selected from benzoic, o-toluic, m-toluic, p-toluic acids.

21. The emulsion of claim 20 wherein the diols are selected from alkyleneglycols having from two to eight carbon atoms.

22. A method of forming an emulsion of a polyester resin, water, and a vinyl monomer cross-linking agent comprising:

a. combining an unsaturated polyester resin which is the reaction product between a polycarboxylic acid and a polyol, water, and a vinyl monomer crosslinking agent, b. admixing therewith ammonium carbonate-carbamate, and c. forming an emulsion from the mixture.

23. The method of claim 22 wherein said ammonium carbonate-carbamate is mixed in an amount of from 1.2 to 0.8 neutralization equivalence range.

24. The method of claim 23 wherein the polyester resin has an acid number of from 30 to 60.

25. The method of claim 22 wherein the water is present in an amount of from 50 to 80 percent based on the polyester-monomer-water mixture.

26. The method of claim 25 wherein the vinyl monomer is styrene present in an amount of from 30 to 70 weight percent based on the polyester-styrene content of the mixture.

27. The method of claim 26 wherein the polyester comprises the esterification product of a saturated aromatic dicarboxylic acid, an unsaturated aliphatic dicarboxylic acid and a polyol.

28. The method of claim 27 wherein the aromatic acid is selected from phthalic, isophthalic and terephthalic acids, the unsaturated aliphatic acid is selected from maleic, fumaric and itaconic acids, and the polyols are selected from ethylene and propylene glycols.

29. The method of claim 27 wherein the polyester additionally comprises a monocarboxylic acid in an amount up to an equivalence ratio of about 1:10 relative to the dicarboxylic acid present.

30. The method of claim 29 wherein the monocarboxylic acid is selected from benzoic and toluic acids.

31. The method of claim 30 wherein the water is present in an amount from 55 to 65 weight percent of the polyester-monomer-water mixture.

32. A process for making a cross-linked water extended polyester resin comprising:

a. reacting a polycarboxylic acid with a polyol to form a polyester, with the proviso that at least one of the two polyester reactants contains an ethylenically unsaturated group capable of cross-linking in the presence of a vinyl monomer cross-linking agent, b. combining the polyester with a vinyl monomer cross-linking agent and water to form a mixture, c. admixing the mixture in the presence of an amount of an ammonium carbonate-carbamate emulsifying agent effective to form a water in oil emulsion of the water and unpolymerized polyester resin, and d. thereafter polymerizing the result to form a solid water extended polyester resin.

33. The process of claim 32 wherein the emulsifying agent is present in a neutralization equivalence range of from 0.8 to 1.2.

34. The process of claim 33 wherein the water comprises a major portion of the emulsion.

35. The process of claim 34 wherein the water is present in an amount up to 80 weight percent based on the resin, cross-linking agent and water.

36. The process of claim 35 wherein the polyester is unsaturated.

37. The process of claim 36 wherein the monomer is styrene and is present in an amount of from 30 to 70 weight percent based upon the total resin.

38. In the process of claim 37, the polycarboxylic acid comprising a saturated aromatic dicarboxylic acid and an unsaturated aliphatic dicarboxylic acid, the polyol comprising an acyclic aliphatic diol, the equivalence ratio of saturated aromatic dicarboxylic acid to unsaturated aliphatic dicarboxylic acid being in the range of 0.7:1.3 to 1.2:1.8, respectively.

39. The process of claim 38 wherein the equivalence ratio of total dicarboxylic acid to total diol is in the range of from 2.0:2.0 to 2.6:2.0, respectively.

40. The process of claim 39 wherein a saturated monocarboxylic acid, present in an equivalence ratio with respect to the saturated dicarboxylic acid of up to 1.0:10.0, is additionally reacted with the diol to form the polyester resin.

* * * * *